United States Patent Office
3,105,018
Patented Sept. 24, 1963

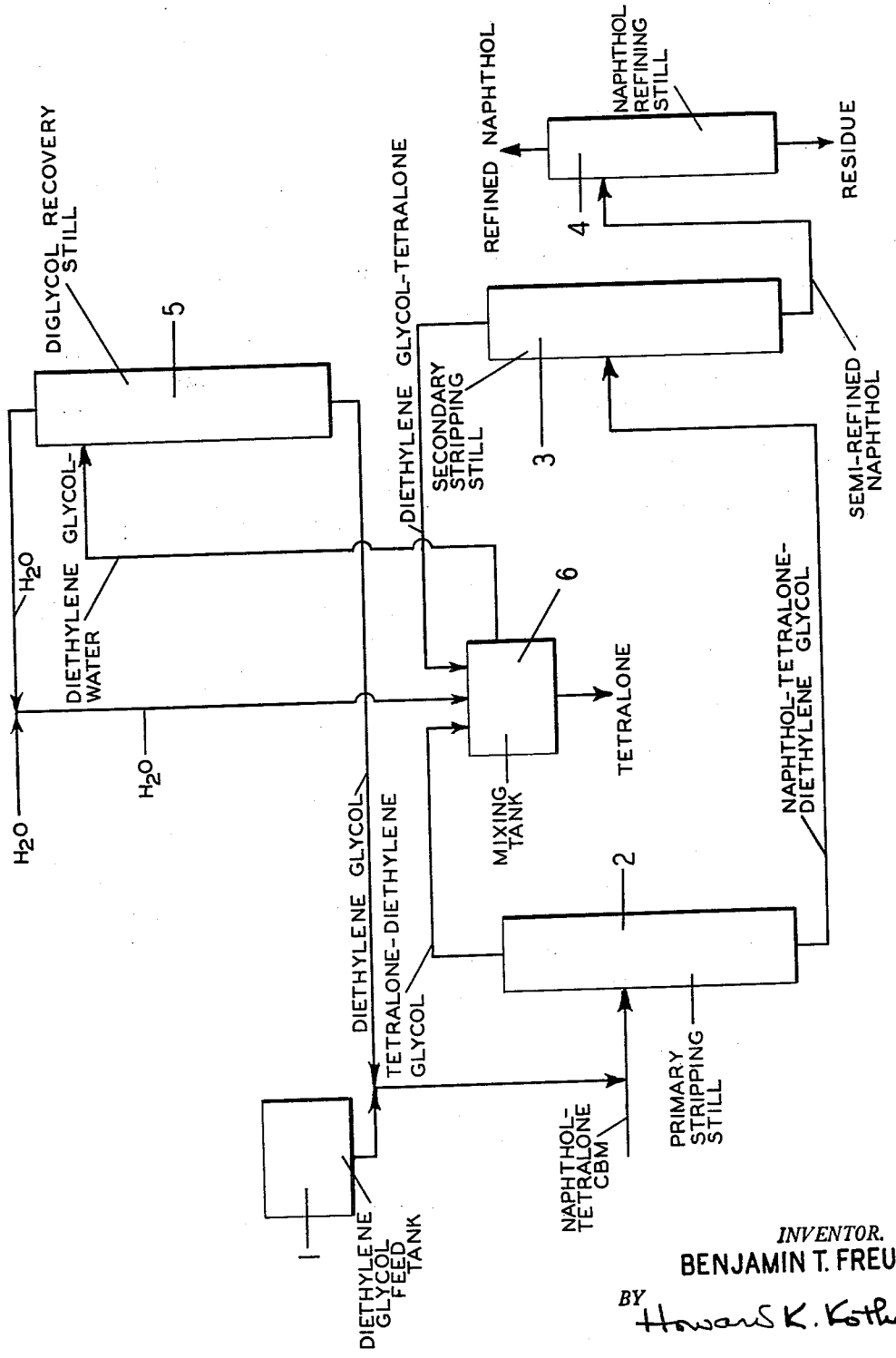

3,105,018
PROCESS FOR THE SEPARATION OF MIXTURES OF 1-NAPHTHOL AND 1-TETRALONE
Benjamin T. Freure, Charleston, W. Va., assignor to Union Carbide Corporation, a corporation of New York
Filed Aug. 25, 1960, Ser. No. 51,919
20 Claims. (Cl. 202—39.5)

This invention relates to a process for the separation of 1-naphthol and 1-tetralone from mixtures thereof. More particularly, this invention relates to the use of certain separating agents to permit the separation of 1-naphthol and 1-tetralone from mixtures thereof by distillation.

It is known that 1-naphthol can be prepared by the dehydrogenation of 1-tetralone. This process has a drawback, due to the fact that the reaction mixture resulting from this process as presently practiced, is a mixture containing about 75 to 85 percent of 1-naphthol and about 15 to 25 percent of 1-tetralone. This mixture cannot be separated by fractional distillation, because a maximum boiling azeotrope is formed between the two compounds at a composition of about 75 percent of 1-naphthol and 25 percent of 1-tetralone. Furthermore, this azeotrope boils at a temperature only a few degrees above the boiling point of 1-naphthol.

The present invention provides a method for recovering 1-naphthol and 1-tetralone which are substantially free of the other component from naphthol-tetralone mixtures. The process of this invention essentially comprises distilling a mixture of 1-naphthol and 1-tetralone with an alcoholic separating agent, which can be an aliphatic alcohol, an ether-alcohol, an aliphatic glycol, or a thioalcohol, to obtain two fractions, one of which contains tetralone and the other of which contains naphthol.

Alcohols that can be employed as separating agents in the process of this invention can be represented by the formulae:

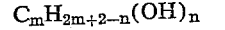
$C_mH_{2m+2-n}(OH)_n$

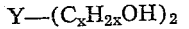
$Y—(C_xH_{2x}OH)_2$

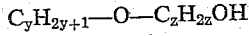
$C_yH_{2y+1}—O—C_zH_{2z}OH$ and

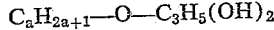
$C_aH_{2a+1}—O—C_3H_5(OH)_2$ wherein $n$ is an integer having a value of from 1 to 3; $m$ is an integer having a value of from about 12 to 14 when $n$ has a value of 1, a value of from about 4 to about 8 when $n$ has a value of 2, and a value of from about 3 to about 6 when $n$ has a value of 3; Y is selected from the group consisting of oxygen and sulfur; $x$ is an integer having a value of from 2 to 3; $z$ is an integer having a value of from 2 to 3; $y$ is an integer having a value of from about 10 to about 12 when $z$ is 2, and a value of from about 9 to about 12 when $z$ is 3; and $a$ is an integer having a value of from about 1 to about 4. The alcohols useful as separating agents in the process of the instant invention are further characterized by having normal boiling points of from about 200° C. to about 300° C.

Aliphatic alcohols that can be used in the process of this invention include any primary, secondary or tertiary aliphatic alcohol having one or more hydroxyl groups. Thus, monohydric alcohols having from about 12 to about 14 carbon atoms, such as lauryl alcohol, tridecyl alcohol, myristyl alcohol, the methylundecanols, the dimethylundecanols, the ethylundecanols, the trimethylundecanols, the propylundecanols, the methylethylundecanols, the dimethyldecanols, the ethyldecanols, the trimethyldecanols, the methylethyldecanols, the propyldecanols, the tetramethyldecanols, the dimethylethyldecanols, the methylpropyldecanols, the diethyldecanols, the butyldecanols, and the like; polyols including diols having from about 4 to about 8 carbon atoms, such as 1,3-butanediol, 1,4-butanediol, 2,3-butanediol, 2-methyl-1,3-propanediol, 1,2-pentanediol, 1,3-pentanediol, 1,4-pentanediol, 1,5-pentanediol, 2,4-pentanediol, 3-methyl-1,2-butanediol, 3-methyl-1,3-butanediol, 3-methyl-1,4-butanediol, 2-methyl-1,3-butanediol, the hexanediols, the heptanediols, the octanediols and the like, and triols having from 3 to about 6 carbon atoms, including glycerol, 1,2,3-butanetriol, 1,2,4-butanetriol, 2-methyl-1,2,3-propanetriol, 1,2,3-pentanetriol, 1,2,4-pentanetriol, 1,2,5-pentanetriol, 1,3,4-pentanetriol, 2,3,4-pentanetriol, 2-ethyl-1,2,3-propanetriol, 1,2,3-hexanetriol, 1,2,4-hexanetriol, 1,2,5-hexanetriol, 1,2,6-hexanetriol, 2,3,4-hexanetriol, 2,3,5-hexanetriol, 1,4,5-hexanetriol, and the like, can be used successfully in the process of this invention. Furthermore, ether glycols, such as diethylene glycol and dipropylene glycol, ether alcohols, such as the decoxyethanols, the undecoxyethanols, the dodecoxyethanols, the nonoxypropanols, the decoxypropanols, the undecoxypropanols, the dodecoxypropanols, the alkoxypropanediols and the like as well as their sulfur analogs, such as thiodiethylene glycol, thiodipropylene glycol and the like can also be employed as separating agents.

Alcohols particularly preferred for use as separating agents in the process of the present invention are diethylene glycol and 1,4-butanediol, because they permit a good separation of the naphthol-tetralone mixture and are easily recovered from the naphthol- and tetralone-containing fractions after separation of such fractions.

The amount of alcohol employed as the separating agent in the process of this invention is dependent upon the amount of 1-tetralone in the tetralone-naphthol mixture. The minimum quantity of the alcohol is about 1.5 times the amount, by weight, of tetralone. The upper limit of the alcohol is dictated only by the capacity of the still and the economics of the process. There is no advantage to the use of great amounts of the alcohol, however, and the preferred amount of alcohol is from about 2 to about 5 times the amount, by weight, of tetralone.

Continuous distillation of the tetralone-naphthol-alcohol mixture results in a first fraction containing 1-tetralone and alcohol substantially free of 1-naphthol. A second fraction containing 1-naphthol and alcohol substantially free of 1-tetralone, is recovered at higher temperatures. Mid-cuts can be obtained at temperatures intermediate between the temperatures at which the naphthol-free and tetralone-free fractions are obtained and contain a mixture of 1-naphthol, 1-tetralone and alcohol. The temperatures at which the various cuts are obtained will vary according to the pressure at which the distillation is conducted. For example, at 10 mm. of mercury pressure a tetralone-alcohol fraction is generally obtained at temperatures of from about 110° C. to about 130° C., but may be obtained at a temperature as high as 140° C. Mid-cuts are generally obtained at temperatures of from about 125 to 130° C. to about 140 to 145° C. and a naphthol-alcohol fraction is generally obtained at temperatures of from about 145° C. to about 150° C. At 50 mm. of mercury pressure the tetralone-containing fraction is generally obtained at temperatures of from about 150° C. to about 165° C., mid-cuts from about 165° C. to about 180° C., and a naphthol-containing fraction from about 180° C. to about 186° C. The distillation can be effected at pressures of from about 2 mm. of mercury up to about atmospheric pressure, but it is preferably conducted at pressures of from about 10 mm. of mercury to about 100 mm. of mercury.

Any suitable distillation means, such as plate columns, packed columns and the like, can be employed in this process. It is preferred, however, that there be at least 8 theoretical plates or stages in the apparatus used.

The process can be conducted continuously, with rectification, removing a tetralone fraction as a heads product and a naphthol fraction as a bottoms product, or batch-wise, removing, successively, a tetralone-containing cut, mid-cuts which can be recycled to the distillation and a naphthol-containing cut.

Recovery of 1-naphthol and 1-tetralone from the tetralone-free and naphthol-free fractions which result from the naphthol-tetralone-alcohol distillation can be accomplished by any of several well known means, such as by distillation or washing the fractions with a solvent for the alcoholic separating agent.

Solvent washing can be accomplished with any inert solvent in which the alcoholic separating agent employed in the process of this invention is soluble, and in which either the naphthol or tetralone are insoluble. It is preferred that the solvent employed be relatively volatile and readily separated from the alcoholic entrainer by distillation. Applicable solvents are water and hydrocarbons boiling from about 60° C. to about 100° C., such as n-hexane, isohexane, n-heptane, isoheptane, isooctane and the like. Water is the preferred solvent, where it can be used, for economic reasons.

Where tetralone cannot be separated from the alcoholic separating agent by a solvent wash, as where the alcohol is immiscible with water, it is readily recovered by adding sufficient boric acid to the tetralone-containing fraction to convert the alcohol to the borate ester. The tetralone can then be distilled off, employing conventional distillation procedures. The borates are readily hydrolized by water. Thus, the alcohol can be recovered by mixing the borate with water, whereby the boric acid precipitates out on cooling and is removed from the aqueous mixture by filtration. The alcohol-water phases of the filtrate are then allowed to settle out and are separated.

In some cases decantation processes can be employed to recover tetralone or naphthol from the two product fractions resulting from the naphthol-tetralone separation. For example, when glycerol is the alcohol employed, the tetralone-containing distillate forms two layers upon standing. The upper layer contains 1-tetralone, and the lower layer contains glycerol. These two layers are easily separated to permit recovery of the 1-tetralone as a product and glycerol which can be recycled to the process.

The preferred method for the recovery of the 1-naphthol from the naphthol-alcohol fraction is by distillation, which can be performed in the same column employed for the naphthol-tetralone separation or in a separate column. This distillation can be carried out at pressures from about 5 mm. of mercury up to about atmospheric pressure. When diethylene glycol, dipropylene glycol or butanediol are employed as the separating agents, it is preferred to conduct this distillation at pressures of greater than about 50 mm. of mercury, because when pressures of less than 50 mm. of mercury are employed an incomplete separation of alcohol from naphthol results. Thus, the naphthol from this distillation may require washing with a solvent for the alcohol for complete separation of said alcohol and 1-naphthol. In some instances, however, such as when hexanetriol, 1,3-butanediol or glycerol are employed as separating agents, pressures of 10 mm. of mercury or less are required to prevent decomposition of these alcohols.

The drawing is a flow diagram illustrating a preferred embodiment of the process of this invention, wherein diethylene glycol is employed as the separating agent.

With reference to the drawing, a constant boiling mixture of 1-naphthol and 1-tetralone (naphthol-tetralone CBM) is combined with diethylene glycol from diethylene glycol feed tank 1, in a weight ratio of diethylene glycol to 1-tetralone of from about 2:1 to about 5:1. The naphthol-diethylene glycol-tetralone mixture is then fed to primary stripping still 2, having at least 8 theoretical plates, wherein distillation of said mixture is conducted at a pressure of from about 10 mm. of mercury to about 50 mm. of mercury. The bottoms from primary stripping still 2, which contain mostly 1-naphthol and diethylene glycol with some tetralone, are fed to secondary stripping still 3, having at least 8 theoretical plates, wherein diethylene glycol and any remaining 1-tetralone are removed overhead by distillation at pressures of from about 50 mm. of mercury to about atmospheric pressure. The semi-refined 1-naphthol removed from the bottom of secondary stripping still 3 can be further purified by distillation in naphthol refining still 4 as shown, or in some other manner, such as by a water wash. The overhead streams from both primary and secondary stripping stills 2 and 3, which contain diethylene glycol and 1-tetralone, are fed to mixing tank 6 and are there mixed with water. Two liquid layers are formed in the mixing tank; the upper layer is a diethylene glycol-water solution and the lower layer is substantially pure 1-tetralone. The diethylene glycol-water layer is drawn off from mixing tank 6 and fed to diethylene glycol recovery still 5 wherein separation of water and diethylene glycol is effected. Diethylene glycol removed from the bottom of diethylene glycol recovery still 5 is recycled and mixed with the incoming naphthol-tetralone mixture. Make-up diethylene glycol from feed tank 1 is fed to primary stripping still 2 as needed. Water removed overhead from diethylene glycol recovery still 5 is recycled to mixing tank 6 as needed.

The following examples are illustrative.

*Example 1*

A charge containing 350 parts by weight of a mixture containing 81.5 weight percent of 1-naphthol and 18.5 weight percent of 1-tetralone, and 350 parts by weight of lauryl alcohol was placed in the kettle of a still having 16 theoretical plates and was distilled at a pressure of 10 mm. of mercury. A cut amounting to 313 parts by weight was recovered at a head temperature of from 130° C. to 140° C. and contained 75 percent of the 1-tetralone charged free of 1-naphthol. The tetralone could be recovered from this fraction by esterification of the alcohol with boric acid to form lauryl borate, and then distilling off the 1-tetralone. Mid-cuts were taken to a head temperature of 143° C. At that temperature a cut amounting to 149 parts by weight was obtained that was free of 1-tetralone and contained 41 percent of the 1-naphthol charged. This cut was added to 680 parts by weight of heptane and was cooled to 15° C., whereby crystals of pure 1-naphthol were precipitated. About 20 percent of the naphthol in the cut was recovered in this manner in a purity of greater than 99%.

*Example 2*

A charge containing 200 parts by weight of a mixture containing 76 weight percent of 1-naphthol and 24 weight percent of 1-tetralone and 200 parts by weight of 7-ethyl-2-methyl-4-undecanol was placed in the kettle of a still having 4 theoretical plates and was distilled at a pressure of 10 mm. of mercury. A tetralone-alcohol fraction, containing about 62.5 percent of the tetralone charged was obtained at head temperatures of from 130° C. to about 140° C. A cut boiling at 145 to 146° C. was then obtained and contained 78 percent of the naphthol charged. This cut was dissolved in three times its own weight of commercial hexane and cooled to 20° C. to separate the naphthol from the tetradecanol. About 52 percent of the naphthol charged was recovered as crystals which melted at 93 to 95° C.

*Example 3*

A charge containing 350 parts by weight of a mixture containing 82.5 weight percent of 1-naphthol and 17.5 weight percent of 1-tetralone and 350 parts by weight of 1,4-butanediol was placed in the kettle of a still having 17 theoretical plates and was distilled at a pressure of 10 mm. of mercury. Cuts obtained at head temperatures of from 115° C. to 130° C. amounted to 331 parts by weight and contained a mixture of 1,4-butanediol and 1-tetralone. This mixture was mixed with 550 parts by weight of water and the resulting mixture was allowed to settle. Two phases formed, one of which contained an aqueous solution of 1,4-butanediol, and the other of which contained 87 percent of the tetralone charged, free of 1-naphthol. A series of mid-cuts was then taken at head temperatures of from 130° C. to 146° C. The head temperatures leveled off at 146° C., and a cut amounting to 355 parts by weight was obtained at this temperature that had a freezing point of 94° C., indicating that it contained over 98 percent 1-naphthol. With credit for column holdup, the purified naphthol amounted to 70 percent of the 1-naphthol charged. Residue that formed was less than 2 percent of the charge.

*Example 4*

A charge containing 350 parts by weight of a mixture containing 82.5 weight percent of 1-naphthol and 17.5 weight percent of 1-tetralone and 350 parts by weight of 1,3-butanediol was placed in the kettle of a still having 17 theoretical plates, and was distilled at a pressure of 10 mm. of mercury. A heads cut, amounting to 375 parts by weight, was obtained at a head temperature of 102° C. to 110° C., from which 70 percent of the tetralone charged was recovered free of 1-naphthol by water washing. Mid-cuts were then taken to a head temperature of 146° C., at which temperature the head temperature leveled off. The fraction recovered at this temperature amounted to about 136 parts by weight and contained about 47 percent of the 1-naphthol charged in a purity of about 97.5 percent. Residue that formed amounted to about 5 percent of the weight of the initial charge.

*Example 5*

Two hundred parts by weight of a mixture containing 76 percent of naphthol and 24 percent of 1-tetralone were distilled with 200 parts by weight of 2-ethyl-1,3-hexanediol at 10 mm. of mercury pressure. Tetralone-alcohol fractions, containing 60 percent of the tetralone charged, were obtained at head temperatures up to 148° C. A tails fraction boiling steadily at 148° C. was then recovered, and was poured into ten times its weight of water, whereby naphthol crystals were precipitated from the solution. The precipitated crystals, amounting to 65 percent of the naphthol charged, melted at 83 to 89° C.

*Example 6*

A charge containing 300 parts by weight of a tetralone-naphthol constant-boiling mixture and 300 parts by weight of glycerol was placed in the kettle of a still having 16 theoretical plates and distillation was carried out under 10 mm. of mercury pressure. The initial distillate was turbid in appearance and separated into two layers upon standing; the upper layer was tetralone and the lower layer was glycerol. Sixty-four parts of tetralone (87 percent of the tetralone charged to the still) were obtained in two cuts. The first cut boiled at 125 to 130° C., and formed a tetralone layer of 35 parts and a glycerol layer of 5 parts. The second cut boiled at 130 to 140° C. and contained 29 parts by weight of the upper tetralone layer and 14 parts by weight of the lower glycerol layer. The distillate then cleared and a mid-cut containing tetralone and naphthol was taken to a head temperature of about 149° C. A cut boiling at 149° C. was obtained which contained 76 percent of the naphthol charged at a purity of 92 percent. Glycerol was recovered from the still at a temperature of 166° C. at 10 mm. pressure.

*Example 7*

A charge containing 300 parts by weight of a constant boiling mixture of 1-tetralone and 1-naphthol and 300 parts by weight of 1,2,6-hexanetriol was placed in the kettle of a still having 16 theoretical plates and distillation was started at a pressure of 10 mm. of mercury. A cut of 29 parts, containing mostly tetralone, was obtained at a head temperature of from 123° C. to 142° C. Mid-cuts containing tetralone and naphthol were taken to 150° C. A cut which contained 73 percent of the naphthol charged to the still in a purity of about 90 percent was obtained at a head temperature of 150° C. The 1,2,6-hexanetriol remaining in the still was boiled off at a pressure of 5 mm. of mercury.

*Example 8*

A charge containing 275 parts by weight of a mixture containing 81 weight percent of 1-naphthol and 19 weight percent of 1-tetralone and 275 parts by weight of a primary decyl ether of ethylene glycol was placed in the kettle of a still having 16 theoretical plates, and was distilled at a pressure of 10 mm. of mercury. A cut, amounting to 224 parts by weight, was obtained at a head temperature of 122° C. to 136° C. which contained substantially all of the tetralone charged. A cut boiling at 147° C. amounted to 219 parts by weight, and contained 1-naphthol free of 1-tetralone. This fraction was mixed with 600 parts by weight of heptane and cooled to 10° C., whereby crystals of 1-naphthol precipitated out. The crystals were recovered by filtration and dried. Fifty-four percent of the 1-naphthol charged was recovered in over 99 per cent purity in this manner.

*Example 9*

A charge containing 200 parts by weight of a mixture containing 81 weight percent of 1-naphthol and 19 weight percent of 1-tetralone and 200 parts by weight of 3-methoxy-1,2-propanediol was placed in the kettle of a still having six theoretical plates and distilled at a pressure of 10 mm. of mercury. A cut amounting to 199 parts by weight was obtained at a head temperature of from 105° C. to 110° C. and contained 58 per cent of the 1-tetralone charged free of 1-naphthol. Several mid cuts were taken to a head temperature of 146° C., at which temperature a cut amounting to 123 parts by weight containing 1-naphthol contaminated with methoxy propanediol and a small amount of 1-tetralone was obtained. The solid, impure naphthol was melted and poured into 700 parts by weight of water, whereby crystals of 1-naphthol precipitated. The naphthol was recovered in a yield of 61.5 per cent at a purity of 88.3 percent.

*Example 10*

A charge containing 150 parts by weight of a mixture containing 80 percent of 1-naphthol and 20 percent of 1-tetralone and 150 parts of diethylene glycol was placed in the kettle of a still having four theoretical plates. The distillation was performed at a pressure of 10 mm. of mercury throughout. A cut obtained at a head temperature of 146 to 147° C. contained 30 percent of the 1-naphthol charged, and was free of 1-tetralone. This cut was thoroughly mixed with ten times its own weight of cold water. The crystals that precipitated out were filtered and dried overnight. The dried crystals melted at 95° C. to 96° C., which corresponds with the melting point of pure 1-naphthol.

*Example 11*

A charge containing 500 parts by weight of a mixture containing 80 percent of 1-naphthol and 20 percent of 1-tetralone and 375 parts by weight of dipropylene glycol was placed in the kettle of a still of seventeen theoretical plates. Distillation was begun under 10 mm. of mercury pressure. A 1-tetralone-dipropylene glycol mixture was distilled off to a head temperature of 125° C., then mid-cuts were taken to a head temperature of 145° C. The pressure was then increased to 25 mm. of mercury and a series of small cuts was taken to a head temperature of about 168° C. The freezing point of the distillate, primarily 1-naphthol, rose to 94° C., and then fell off slightly. About 48 percent of the naphthol charged was obtained as a product having a freezing point greater than 90° C.

*Example 12*

A charge containing 250 parts by weight of a mixture containing 81.5 weight percent of 1-naphthol and 18.5 weight percent of 1-tetralone and 250 parts by weight of thiodiethylene glycol was placed in the kettle of a still having six theoretical plates and was distilled at a pressure of 10 mm. of mercury. Cuts recovered at a head temperature of from 133° C. to 150° C. amounted to 51 parts by weight and contained 92 percent of the tetralone charged free of 1-naphthol. The remaining material, amounting to 440 parts by weight, was mixed with 2600 parts by weight of water whereby crystals of 1-naphthol were precipitated. The crystals were recovered by filtration and drying. The yield was 41 percent of the naphthol charged at a purity of 98 percent. The balance of the 1-naphthol could be recovered from the aqueous thiodiglycol filtrate by extraction with isopropyl ether.

*Example 13*

A charge containing 150 parts by weight of a mixture containing 80 percent of 1-naphthol and 20 percent of 1-tetralone and 150 parts by weight of diethylene glycol was placed in the kettle of a still having four theoretical plates. The distillation was performed at a pressure of 10 mm. of mercury throughout. A tetralone-containing fraction was obtained at head temperatures up to 145° C. About 85 percent of the naphthol charged was obtained as a cut boiling at 145 to 147° C. This cut was poured into five times its weight of cold water and crystals of about 95 percent purity and amounting 73 percent of the naphthol charged were recovered.

*Example 14*

A charge containing 883 parts by weight of a mixture containing 78 weight percent of 1-naphthol and 22 weight percent of 1-tetralone was placed in a distilling flask and 660 parts by weight of diethylene glycol were added. The mixture was distilled at a pressure of 50 mm. of mercury using a column packed with glass helices equivalent to nine theoretical plates. A heads cut boiling at 148 to 162° C. was obtained. This cut amounted to 762 parts by weight and contained 155 parts by weight of 1-tetralone along with most of the glycol charged to the distilling flask and contained no naphthol. Several mid-cuts were then taken to a head temperature of 178° C., at which temperature a cut freezing at 93° C. was obtained. Subsequent analysis showed this cut to contain at least 98 percent 1-naphthol, with less than 2 percent diethylene glycol and only a trace of 1-tetralone. The amount recovered at 178° C., together with the column holdup, amounted to 63 percent of the naphthol charged to the still. Residue formation amounted to only 2 percent of the naphthol-tetralone mixture charged. On dilution with an equal volume of water, the heads product separated into two layers, one of which contained an aqueous solution of the glycol. The other layer contained pure 1-tetralone.

*Example 15*

A charge containing 500 parts by weight of a mixture containing 80 percent of 1-naphthol and 20 percent of 1-tetralone was placed in a distilling flask and 375 parts by weight of diethylene glycol were added. The flask was installed below a column having seventeen theoretical plates and distillation was started at 10 mm. of mercury pressure. A cut of 194 parts, containing 85 percent of the 1-tetralone charged to the still, free of 1-naphthol, was obtained at a head temperature of 117 to 125° C. Subsequent cuts taken to 146° C. were found to contain nearly all of the remaining tetralone as well as diethylene glycol and naphthol. The total distillate to this point amounted to 483 parts. The head temperature leveled off at 146° C., close to the boiling point of pure naphthol. Spot samples of the distillate were taken for freezing point determination and the distillation was continued according to the following log:

| BP., °C. | Pressure, mm. of Hg | Parts by Weight | Kettle Temp., °C. | F.P., °C. |
|---|---|---|---|---|
| 146 | 10 | 49 | 166 | 79 |
| 162 | 20 | 144 | 187 | a 91 |

The above cuts were combined and recharged to the distilling flask.

| 186 | 50 | 127 | 205 | 93 | a F.P. fell at first on raising the pressure, then rose and leveled off at 91° C.

Further distillation at 100 mm. failed to increase the freezing point due to the small amount of material remaining in the still.

*Example 16*

A charge containing 450 parts by weight of commercial 1-naphthol (freezing point=93.5° C.) was placed in the kettle of a still having a column of seventeen theoretical plates and 50 parts by weight of diethylene glycol were added. Distillation was begun under a pressure of 100 mm. of mercury. After removal of 138 parts of distillate, a spot sample was taken which froze at 93.5° C. The balance of the distillate, amounting to 67 percent of the naphthol charged, was then taken in one cut. This cut froze at 94° C., indicating greater purity than the starting material. No diethylene glycol was found in the final cut by infrared examination. The kettle temperature during the distillation of the principal cut was 225° C. This example demonstrates that if the kettle temperature is high enough diethylene glycol can be completely separated from 1-naphthol by distillation.

I claim:

1. The process for the separation of a mixture consisting essentially of 1-tetralone and 1-naphthol which comprises distilling said mixture together with an alcohol selected from the group consisting of alcohols having the formulae:

$$C_mH_{2m+2-n}(OH)_n$$

$$Y(C_xH_{2x}OH)_2$$

$$C_yH_{2y+1}-O-C_zH_{2z}OH$$

and $$C_aH_{2a+1}-O-C_3H_5(OH)_2$$

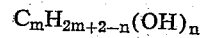
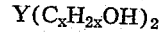
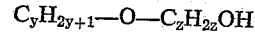
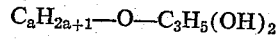

wherein $n$ is an integer having a value of from 1 to 3; $m$ is an integer having a value of from about 12 to about 14 when $n$ is 1, a value of from about 4 to about 8 when $n$ is 2, and a value of from about 3 to about 6 when $n$ is 3; Y is selected from the group consisting of oxygen and sulfur; $x$ is an integer having a value of from 2 to 3; $z$ is an integer having a value of from 2 to 3; $y$ is an integer having a value of from about 10 to about 12 when $z$ is 2, and a value of from about 9 to about 12 when $z$ is 3; and $a$ is an integer having a value of from about 1 to about 4, and obtaining a lower-boiling fraction containing 1-tetralone substantially free of 1-naphthol and a higher-boiling fraction containing 1-naphthol substantially free of 1-tetralone.

2. The process for the separation of a mixture consisting essentially of 1-tetralone and 1-naphthol which comprises distilling said mixture together with an alcohol having the formula:

$$C_mH_{2m+2-n}(OH)_n$$

wherein $n$ is an integer having a value of from 1 to 3 and $m$ is an integer having a value of from about 12 to about 14 when $n$ is 1, a value of from about 4 to about 8 when $n$ is 2, and a value of from about 3 to about 6 when $n$ is 3, and obtaining a lower-boiling fraction containing 1-tetralone substantially free of 1-naphthol and a higher-boiling fraction containing 1-naphthol substantially free of 1-tetralone.

3. The process for the separation of a mixture consisting essentially of 1-tetralone and 1-naphthol which comprises distilling said mixture together with a monohydric aliphatic alcohol having from about 12 to about 14 carbon atoms and obtaining a lower-boiling fraction containing 1-tetralone substantially free of 1-naphthol and a higher-boiling fraction containing 1-naphthol substantially free of 1-tetralone.

4. The process for the separation of a mixture consisting essentially of 1-tetralone and 1-naphthol which comprises distilling said mixtures together with lauryl alcohol and obtaining a lower-boiling fraction containing 1-tetralone substantially free of 1-naphthol and a higher-boiling fraction containing 1-naphthol substantially free of 1-tetralone.

5. The process for the separation of a mixture consisting essentially of 1-tetralone and 1-naphthol which comprises distilling said mixtures together with 7-ethyl-2-methyl-4-undecanol and obtaining a lower-boiling fraction containing 1-tetralone substantially free of 1-naphthol and a higher-boiling fraction containing 1-naphthol substantially free of 1-tetralone.

6. The process for the separation of a mixture consisting essentially of 1-tetralone and 1-naphthol which comprises distilling said mixtures together with a dihydric aliphatic alcohol having from about 4 to about 8 carbon atoms and obtaining a lower-boiling fraction containing 1-tetralone substantially free of 1-naphthol and a higher-boiling fraction containing 1-naphthol substantially free of 1-tetralone.

7. The process for the separation of a mixture consisting essentially of 1-tetralone and 1-naphthol which comprises distilling said mixtures together with 1,3-butanediol and obtaining a lower-boiling fraction containing 1-tetralone and a higher-boiling fraction containing 1-naphthol substantially free of 1-tetralone.

8. The process for the separation of a mixture consisting essentially of 1-tetralone and 1-naphthol which comprises distilling said mixtures together with 1,4-butanediol and obtaining a lower-boiling fraction containing 1-tetralone substantially free of 1-naphthol and a higher-boiling fraction containing 1-naphthol substantially free of 1-tetralone.

9. The process for the separation of a mixture consisting essentially of 1-tetralone and 1-naphthol which comprises distilling said mixtures together with 2-ethyl-1,3-hexanediol and obtaining a lower-boiling fraction containing 1-tetralone substantially free of 1-naphthol and a higher-boiling fraction containing 1-naphthol substantially free of 1-tetralone.

10. The process for the separation of a mixture consisting essentially of 1-tetralone and 1-naphthol which comprises distilling said mixtures together with a trihydric aliphatic alcohol having from about 3 to about 6 carbon atoms and obtaining a lower-boiling fraction containing 1-tetralone substantially free of 1-naphthol and a higher-boiling fraction containing 1-naphthol substantially free of 1-tetralone.

11. The process for the separation of a mixture consisting essentially of 1-tetralone and 1-naphthol which comprises distilling said mixture together with glycerol and obtaining a lower-boiling fraction containing 1-tetralone substantially free of 1-naphthol and a higher-boiling fraction containing 1-naphthol substantially free of 1-tetralone.

12. The process for the separation of a mixture consisting essentially of 1-tetralone and 1-naphthol which comprises distilling said mixture together with 1,2,6-hexanetriol and obtaining a lower-boiling fraction containing 1-tetralone substantially free of 1-naphthol and a higher-boiling fraction containing 1-naphthol substantially free of 1-tetralone.

13. The process for separating a mixture consisting essentially of 1-tetralone and 1-naphthol which comprises distilling said mixture together with an alcohol having the formula:

$$Y(C_xH_{2x}OH)_2$$

wherein Y is selected from the group consisting of oxygen and sulfur and $x$ is an integer having a value of from 2 to 3, and obtaining a lower-boiling fraction containing 1-tetralone substantially free of 1-naphthol and a higher-boiling fraction containing 1-naphthol substantially free of 1-tetralone.

14. The process for the separation of a mixture consisting essentially of 1-tetralone and 1-naphthol which comprises distilling said mixture together with diethylene glycol and obtaining a lower-boiling fraction containing 1-tetralone substantially free of 1-naphthol and a higher-boiling fraction containing 1-naphthol substantially free of 1-tetralone.

15. The process for the separation of a mixture consisting essentially of 1-tetralone and 1-naphthol which comprises distilling said mixture together with dipropylene glycol and obtaining a lower-boiling fraction containing 1-tetralone substantially free of 1-naphthol and a higher-boiling fraction containing 1-naphthol substantially free of 1-tetralone.

16. The process for the separation of a mixture consisting essentially of 1-tetralone and 1-naphthol which comprises distilling said mixture together with thiodiethylene glycol and obtaining a lower-boiling fraction containing 1-tetralone substantially free of 1-naphthol and a higher-boiling fraction containing 1-naphthol substantially free of 1-tetralone.

17. The process for separating a mixture consisting essentially of 1-tetralone and 1-naphthol which comprises distilling said mixture together with an alcohol having the formula:

$$C_yH_{2y+1}-O-C_zH_{2z}OH$$

wherein $z$ is an integer having a value of from 2 to 3 and $y$ is an integer having a value of from about 10 to about 12 when $z$ is 2 and a value of from about 9 to about 12 when $z$ is 3, and obtaining a lower-boiling fraction containing 1-tetralone substantially free of 1-naphthol and a lower-boiling fraction containing 1-naphthol substantially free of 1-tetralone.

18. The process for the separation of a mixture consisting essentially of 1-tetralone and 1-naphthol which comprises distilling said mixture together with decoxyethanol and recovering a lower-boiling fraction containing 1-tetralone substantially free of 1-naphthol and a higher-boiling fraction containing 1-naphthol substantially free of 1-tetralone.

19. The process for separating a mixture consisting essentially of 1-tetralone and 1-naphthol which comprises distilling said mixture together with an alcohol having the formula:

$$C_aH_{2a+1}-O-C_3H_5(OH)_2$$

wherein $a$ is an integer having a value of from about 1 to about 4 and obtaining a lower-boiling fraction containing 1-tetralone substantially free of 1-naphthol and a higher-boiling fraction containing 1-naphthol substantially free of 1-tetralone.

20. The process for the separation of a mixture consisting essentially of 1-tetralone and 1-naphthol which comprises distilling said mixture together with 3-methoxy-1,2-propanediol and recovering a lower-boiling fraction containing 1-tetralone substantially free of 1-naphthol and a higher-boiling fraction containing 1-naphthol substantially free of 1-tetralone.

References Cited in the file of this patent

UNITED STATES PATENTS

| | | |
|---|---|---|
| 1,717,009 | Davis | June 11, 1929 |
| 2,436,864 | Johnson | Mar. 2, 1948 |
| 2,462,103 | Johnson | Feb. 22, 1949 |
| 2,595,266 | Johnson | May 6, 1952 |
| 2,773,006 | Carver et al. | Dec. 4, 1956 |
| 2,776,936 | Bondor et al. | Jan. 8, 1957 |